(12) United States Patent
Koike

(10) Patent No.: US 7,581,126 B2
(45) Date of Patent: Aug. 25, 2009

(54) INFORMATION RECORDING APPARATUS

(75) Inventor: Yutaka Koike, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 474 days.

(21) Appl. No.: 11/337,424

(22) Filed: Jan. 23, 2006

(65) Prior Publication Data
US 2006/0179344 A1 Aug. 10, 2006

(30) Foreign Application Priority Data
Feb. 9, 2005 (JP) ............... 2005-032979

(51) Int. Cl.
G06F 1/32 (2006.01)
(52) U.S. Cl. .............. 713/320; 713/300; 713/324
(58) Field of Classification Search ......... 713/300–375, 713/600
See application file for complete search history.

(56) References Cited

U.S. PATENT DOCUMENTS 5,282,054 A * 1/1994 Oana et al. .............. 358/406
2001/0003206 A1 * 6/2001 Pole et al. ............... 713/320
2001/0029196 A1 * 10/2001 Wakamatsu .............. 455/574
2002/0144057 A1 * 10/2002 Li et al. .................. 711/112
2002/0177475 A1 * 11/2002 Park ....................... 455/574
2003/0193472 A1 * 10/2003 Powell .................... 345/102
2005/0085277 A1 * 4/2005 Chen et al. .............. 455/572

FOREIGN PATENT DOCUMENTS

| JP | 2001-147784 | 5/2001 |
| JP | 2001-243697 | 9/2001 |
| JP | 2003-187516 | 7/2003 |
| JP | 2004-38290 | 2/2004 |

* cited by examiner

Primary Examiner—Mark Connolly
Assistant Examiner—Paul B Yanchus, III
(74) Attorney, Agent, or Firm—Knobbe, Martens, Olson & Bear, LLP

(57) ABSTRACT

When a rebuild process is to be performed for a disk array, a power supply is checked. In this case, when a battery is used, the rebuild process is inhibited in accordance with a user setting. The remaining capacity of the battery is checked to change the effective rate of the rebuild process on the basis of the remaining capacity. A consistency check is also performed in the same manner.

3 Claims, 4 Drawing Sheets

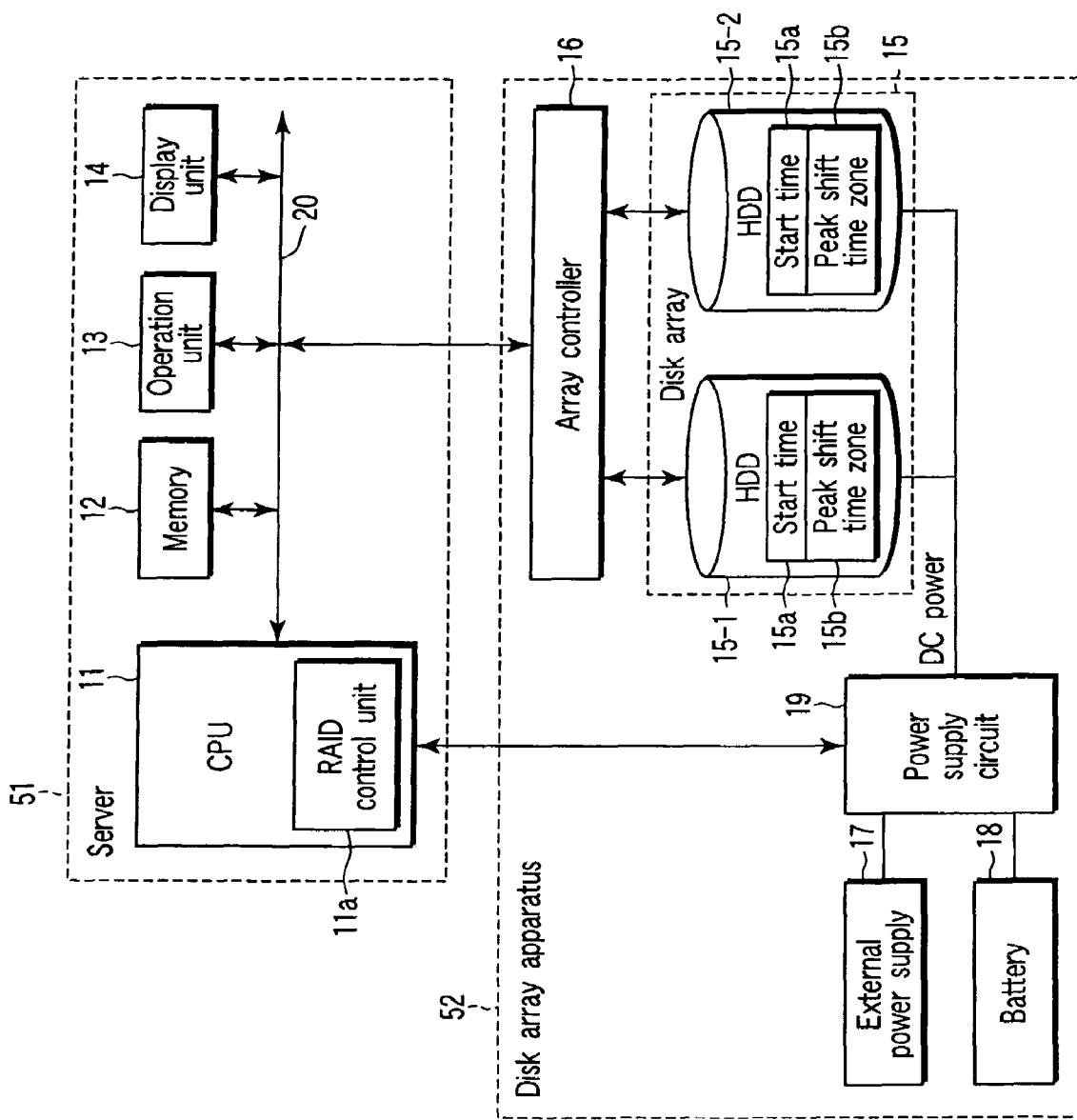
F I G. 5

INFORMATION RECORDING APPARATUS

CROSS-REFERENCE TO RELATED APPLICATIONS

This application is based upon and claims the benefit of priority from prior Japanese Patent Application No. 2005-032979, filed Feb. 9, 2005, the entire contents of which are incorporated herein by reference.

BACKGROUND OF THE INVENTION

1. Field of the Invention

The present invention relates to an information recording apparatus such as a computer including a Redundant Array of Independent Disks (RAID) configuration, which operates a plurality of recording apparatuses in parallel.

2. Description of the Related Art

In a computer system, a RAID technique has been used as a technique of allowing high-speed access to a recording apparatus such as a hard disk drive (HDD), and improving its reliability. RAID is a technique for increasing access speed and improving reliability by exploiting the redundancy of data in a plurality of HDDs. Various types of RAID configuration, e.g., RAID0, RAID1, and RAID5 are defined.

More specifically, RAID1, RAID5, and the like feature redundant of the data. Hence, if one HDD which forms part of a RAID configuration fails, the data stored in the failed HDD can be calculated and generated from the data in the remaining normal HDDs. Generally, when one HDD fails in this system, the failed HDD is replaced with a new one. The data are then sequentially read from the remaining normal HDDs to calculate and generate the data to be stored in the failed HDD. After that, the obtained data is written in sectors designated by all addresses of the new HDD (to be referred to as a "rebuild process" hereinafter). Accordingly, the data which has been stored in the failed HDD can be restored (e.g., see Jpn. Pat. Appln. KOKAI Publication No. 2004-38290).

As described above, RAID1, RAID5, and the like have redundant data, and consistency of these data must be kept. If the consistency cannot be kept, the above-described rebuild process cannot be performed normally. Hence, in a system such as a RAID1 or RAID5 system which has redundant data, consistency is generally checked periodically (to be referred to as a consistency check hereinafter).

RAID is widely used in a server or the like as disclosed in Jpn. Pat. Appln. KOKAI Publication No. 2004-038290. According to a recent proposal, RAID is applied to a device such as a notebook-type personal computer (PC) which is portable (to be referred to as a "portable device" hereinafter). In this portable device, the HDD may fail due to vibration while carrying the device. Hence, RAID can be applied to the portable device, thus increasing its reliability.

The above-described portable device can be generally driven by a battery. The above-described rebuild process and consistency check are time-consuming processes with high power consumption. Hence, when the above-described RAID is applied to such a portable device, power is consumed in the rebuild process and consistency check, and operation time can be shortened.

A computer disclosed in Jpn. Pat. Appln. KOKAI Publication No. 2004-038290 incorporates a battery. However, this computer is presumed to mainly receive power from an external power supply but not from the battery.

BRIEF SUMMARY OF THE INVENTION

According to an embodiment of the present invention, an information recording apparatus which builds a single logical recording apparatus by arranging a plurality of recording apparatuses in parallel comprises a power supply unit configured to supply power to the plurality of recording apparatuses, a rebuilding unit configured to rebuild data on an arbitrary recording apparatus of the plurality of recording apparatuses by using data on another recording apparatus, and a power saving unit configured to perform power saving control for the rebuilding unit on the basis of the type of power supply unit.

According to another embodiment of the present invention, an information recording apparatus which builds a single logical recording apparatus by arranging a plurality of recording apparatuses in parallel comprises a power supply unit configured to supply power to the plurality of recording apparatuses, a checking unit configured to check consistency between data of the plurality of recording apparatuses, and a power saving unit configured to perform power saving control for the checking unit on the basis of the type of power supply unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing the arrangement of a disk array system as a modification of the information recording apparatus according to the present invention.

DETAILED DESCRIPTION OF THE INVENTION

An information recording apparatus of the present invention will be described below with reference to the accompanying drawing.

Figure 1:
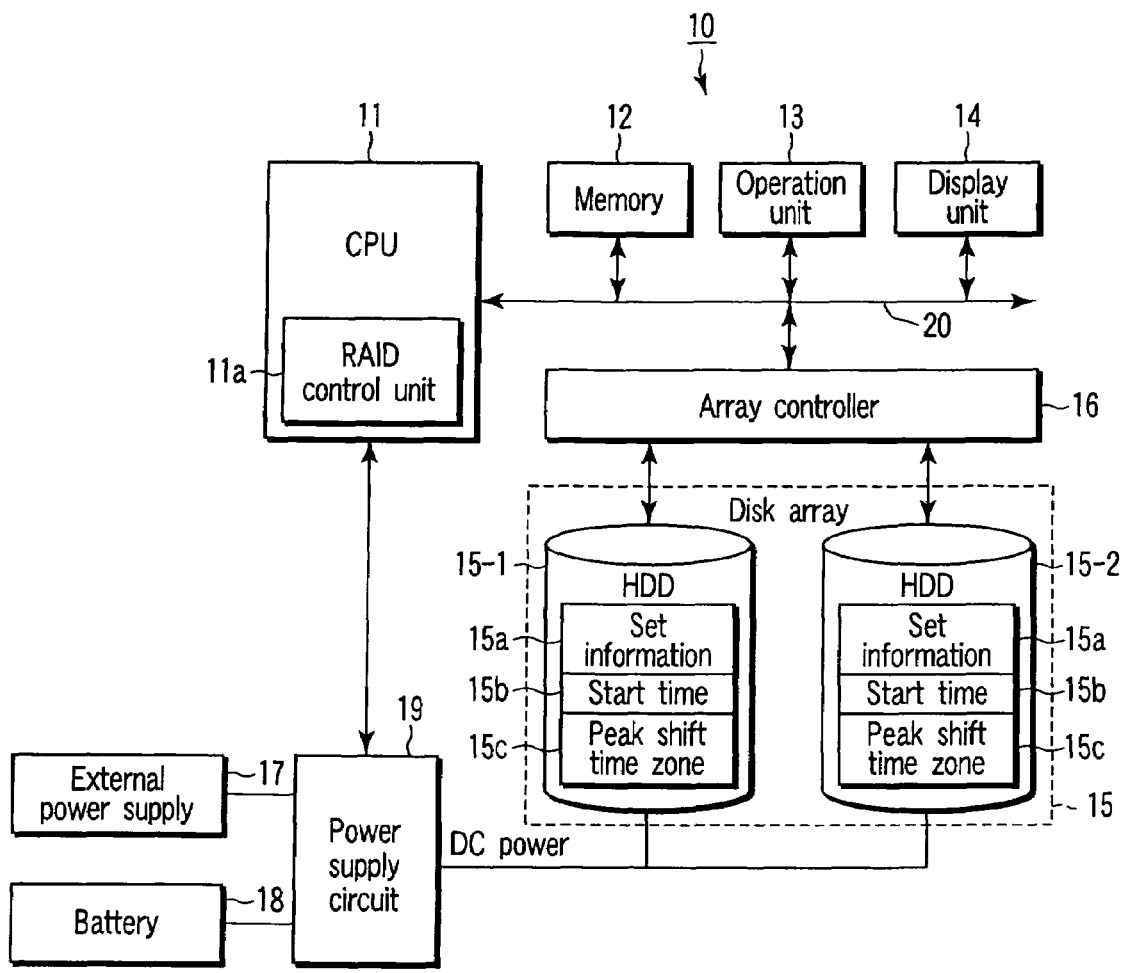
FIG. 1 is a block diagram showing the arrangement of a notebook-type PC as an embodiment of an information recording apparatus according to the present invention.

FIG. 1 is a block diagram showing the arrangement of a notebook-type PC which implements an information recording apparatus according to an embodiment of the present invention. As shown in FIG. 1, a notebook-type PC 10 includes a central processing unit (CPU) 11, a memory 12, an operation unit 13 such as a mouse or keyboard, a display unit 14 such as a display, HDDs 15-1 and 15-2 included in a disk array 15, an array controller 16 which controls the disk array 15, an external power supply 17, a battery 18, and a power supply circuit 19 which supplies, to the HDDs 15-1 and 15-2, a DC power from the external power supply 17 or battery 18.

In this embodiment, assume that the RAID level of the disk array 15 is RAID1. However, a person skilled in the art would understand that the present invention is not limited to RAID1 but can generally be applied to another RAID such as RAID0 or RAID5.

The CPU 11 is a processor arranged for systematically controlling the overall operation of the notebook type PC 10, and executes various programs which operate on the notebook-type PC 10. The CPU 11 also functions as a RAID control unit 11a in accordance with the program running in the notebook type PC 10.

The RAID control unit 11a controls RAID, e.g., controls to write identical data on the plurality of HDDs by mirroring as in RAID1. The rebuild process and consistency check are also performed through the RAID control unit 11a.

Figure 2:
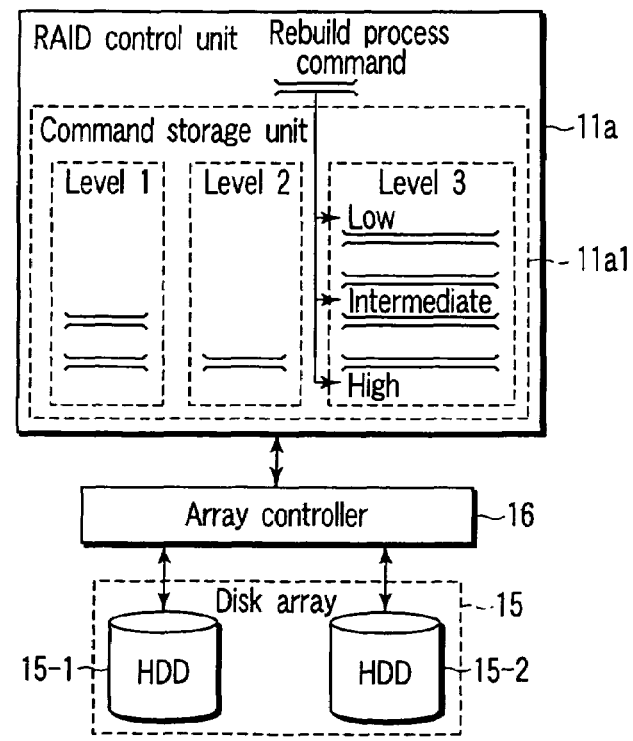
FIG. 2 is a block diagram showing the arrangement of a RAID control unit in a notebook-type PC as the embodiment of the information recording apparatus according to the present invention.

FIG. 2 is a block diagram showing the arrangement of the RAID control unit 11a. As shown in FIG. 2, the RAID control unit 11a includes a command storage unit 11a1 which stores commands for causing the RAID control unit 11a to control the disk array 15, e.g., for controlling to write and read the data. In the command storage unit 11a1, the priority levels from level 1 to level 3 are set. The commands stored at level 2 are executed after the commands stored at level 1 are completely executed, and the commands stored at level 3 are executed after all the commands stored at levels 1 and 2 are completely executed.

Referring back to FIG. 1, the memory 12 is connected to the CPU 11 via a bus 20, and includes a read-only memory (ROM) in which a basic program executed by the CPU 11 is stored, and a random access memory (RAM) which is used as a work memory. The operation unit 13 is a mouse or keyboard, and used to input various instructions and pieces of information from a user. The display unit 14 is a display such as a liquid crystal display (LCD) to display the information to the user. The operation unit 13 and display unit 14 are connected to the CPU 11 via the bus 20.

The disk array 15 includes the HDDs 15-1 and 15-2. Since the data written from the RAID control unit 11a of the CPU 11 to the disk array 15 via the array controller 16 is mirrored, the identical data are written on the HDDs 15-1 and 15-2. As will be described later, even while using the battery 18, set information 15a (setting unit) which sets whether the rebuild process and consistency check are performed for the disk array 15, start time 15b at which consistency check is performed for the disk array 15, and a peak shift time zone 15c during which the battery 18 supplies power to the power supply circuit 19 as a power supply are stored in each of the HDDs 15-1 and 15-2. Since the data in the disk array 15 is mirrored, the set information 15a, start time 15b, and peak shift time zone 15c stored in the HDD 15-1 are identical to those in the HDD 15-2.

The array controller 16 is connected to the CPU 11 via the bus 20, and functions as the interface of the disk array 15. The array controller 16 controls to write/read the data in/from the HDDs 15-1 and 15-2, in accordance with the command from the RAID control unit 11a.

Under the control of the CPU 11, the power supply circuit 19 switches between external power supply 17 and battery 18 as the power supply to convert the voltage from the power supply into a preferable voltage. Additionally, the power supply circuit 19 also has a function to supply power to the HDDs 15-1 and 15-2. The power supply circuit 19 can also check the remaining capacity of the battery 18 by measuring the voltage of the battery 18. As not shown in FIG. 1, the power supply circuit 19 also supplies power to other units such as the CPU 11 and display unit 14.

Figure 3:
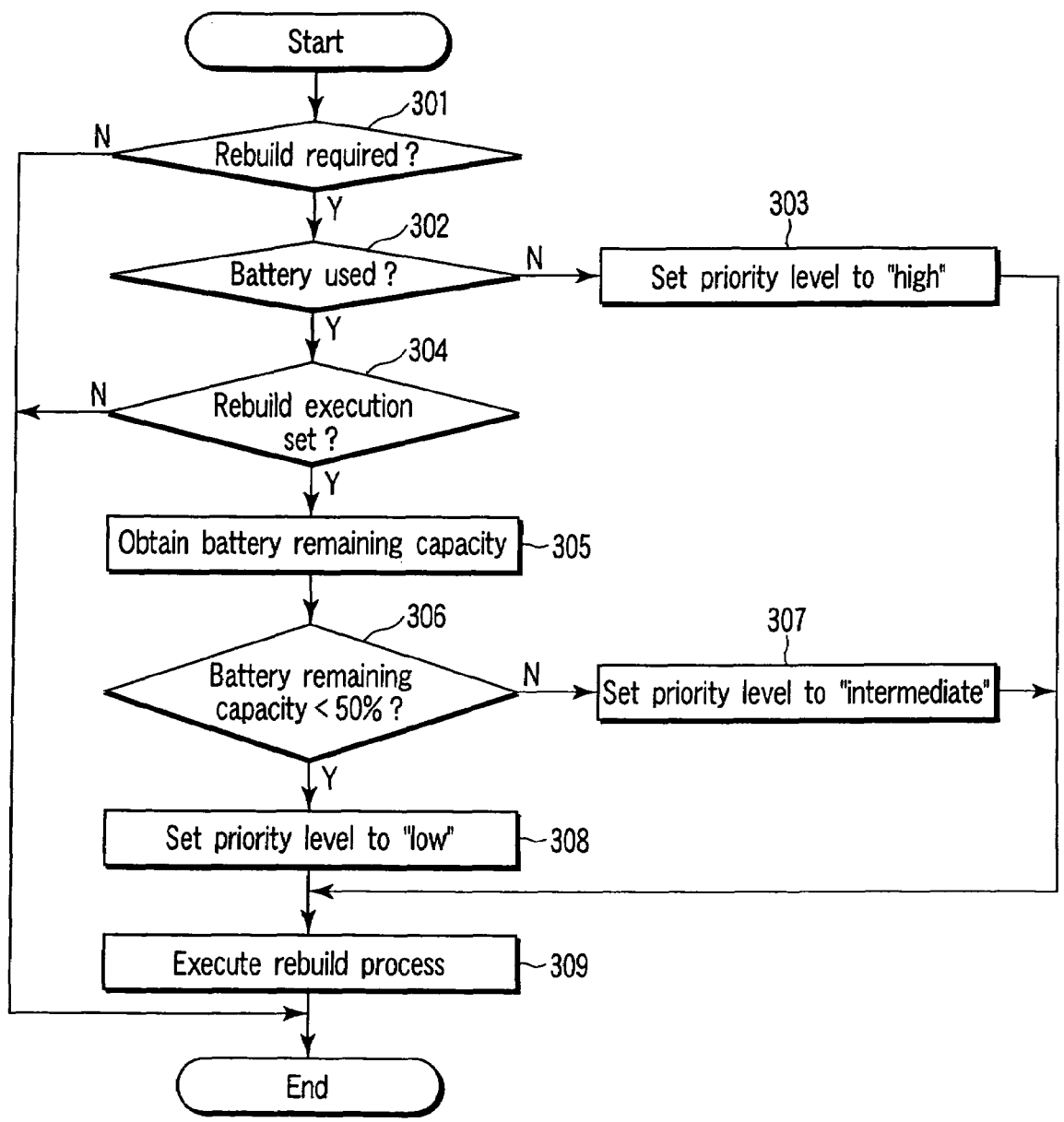
FIG. 3 is a flowchart showing an example of a process flow of a program when performing a rebuild process in the notebook-type PC as the embodiment of the information recording apparatus according to the present invention.

The flow of the rebuild process will be described below. FIG. 3 is a flowchart showing the process flow of a program executed by the CPU 11 when the rebuild process is performed for the disk array 15. In the following description, a command for the rebuild process is executed at level 3 of the command storage unit 11a1. However, the command for the rebuild process need not be executed only at level 3 but may also be executed at level 1 or level 2.

First, the CPU 11 determines whether the rebuild process is required (step 301). More specifically, the rebuild process is required when the HDD 15-1 fails and the user replaces the failed HDD with a new one, or when the rebuild process is interrupted by power-off operation. If the rebuild process is not required (NO in step 301), this process is not performed.

If the rebuild process is required (YES in step 301), the CPU 11 checks the power supply (step 302). More specifically, the CPU 11 checks, through the power supply circuit 19, whether electric power is supplied from the external power supply 17 or battery 18. If electric power is supplied from the external power supply 17 (NO in step 302), the priority level of the command for the rebuild process is set to "high" (step 303). When the priority level of the command is set to "high", as shown in FIG. 2, for example, the rebuild process command is inserted at the head (lower side in FIG. 2) of the commands stored at level 3 of the command storage unit 11a1.

If electric power is supplied from the battery 18 (YES in step 302), the CPU 11 checks whether the user sets to perform the rebuild process even while using the battery 18 (step 304). This setting can be checked by reading the set information 15a stored in the disk array 15. If the user sets the set information 15a to inhibit the rebuild process while using the battery 18 (NO in step 304), the rebuild process is not performed.

If the set information 15a is set to perform the rebuild process even while using the battery 18 (YES in step 304), the remaining capacity of the battery 18 is obtained from the power supply circuit 19 (step 305). The CPU 11 also determines whether the obtained remaining capacity of the battery 18 is equal to or larger than 50% of the overall capacity (step 306). If the remaining capacity is equal to or larger than 50% of the overall capacity (NO in step 306), the priority level of the command for the rebuild process is set to "intermediate" (step 307). When the priority level of the command is set to "intermediate", as shown in FIG. 2, for example, the command for the rebuild process is inserted in the intermediate position among the commands stored at level 3 of the command storage unit 11a1.

If the remaining capacity of the battery 18 is smaller than 50% of the overall capacity (YES in step 306), the priority level of the command for the rebuild process is set to "low" (step 308). When the priority level of the command is set to "low", as shown in FIG. 2, for example, the command for the rebuild process is inserted at the end of the commands stored at level 3 of the command storage unit 11a1.

When the priority level of the command for the rebuild process is set in steps 303, 307, and 308, the rebuild process is performed in accordance with the priority level (step 309). At this time, concurrently with the rebuild process, the RAID control unit 11a controls to normally write/read the data in/from the disk array 15 in accordance with the instruction input by the user from the operation unit 13. When the priority level of the command for the rebuild process is low, a large number of commands from the user for controlling to write/ read the data must be executed. Accordingly, the effective rate of the rebuild process decreases.

Figure 4:
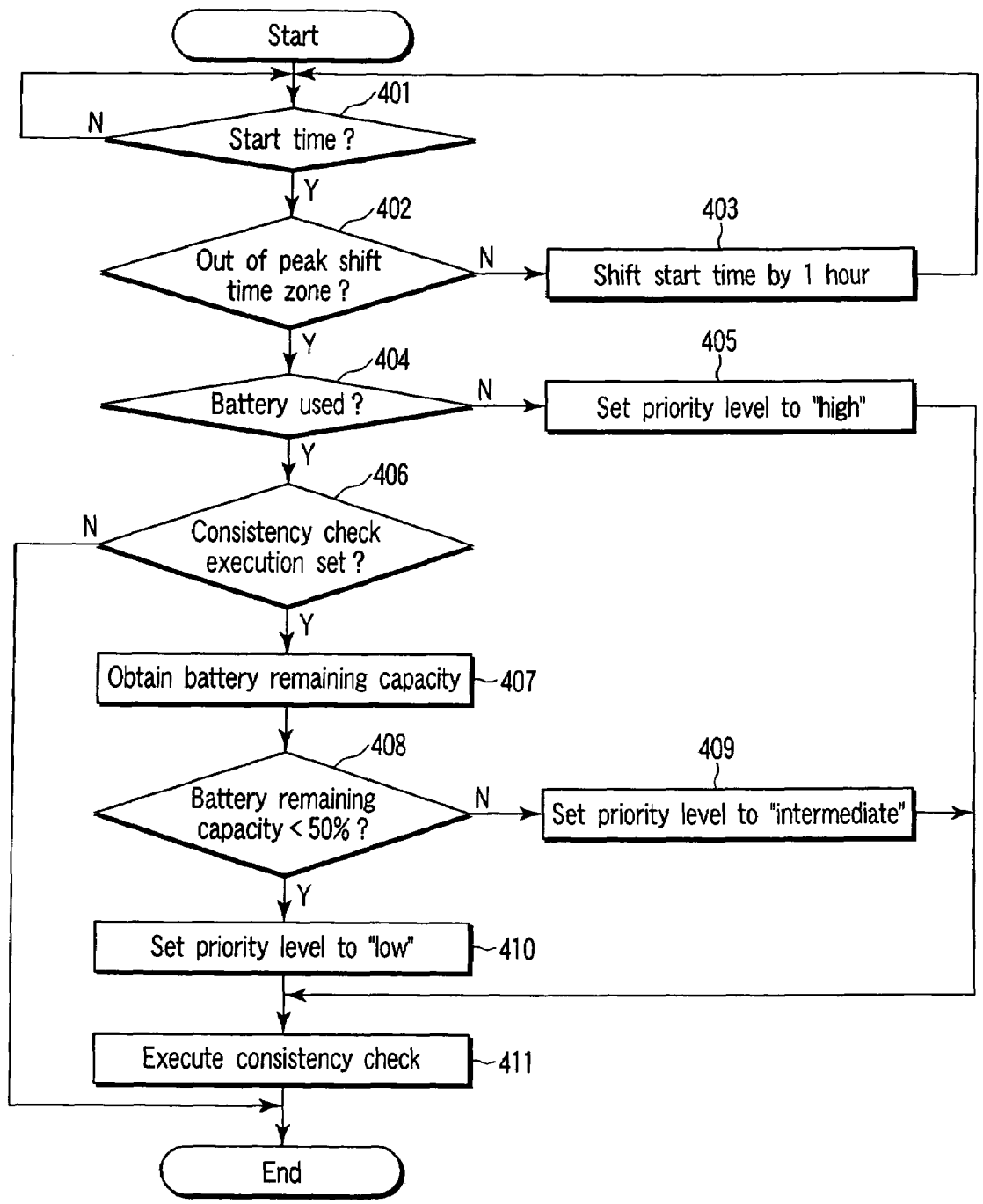
FIG. 4 is a flowchart showing the example of the process flow of a program when performing consistency check in the notebook-type PC as the embodiment of the information recording apparatus according to the present invention.

The flow of consistency check for the disk array 15 will be described below. FIG. 4 is a flowchart showing the process flow of a program executed by the CPU 11 when consistency check is performed for the disk array 15. In the following description, a command for consistency check is executed at level 3 of the command storage unit 11a1. However, the command for consistency check is not executed only at level 3 but also executed at level 1 or level 2.

First, the CPU 11 determines whether it is the set start time 15b (step 401). The set start time 15b is stored in the disk array 15 in advance as, e.g., "Third Wednesday at 12:00". If the time does not reach the start time 15b (NO in step 401), the start time 15b is waited for.

At the start time 15b (YES in step 401), whether it is in the peak shift time zone 15c is determined (step 402). The peak shift time zone 15c is a time zone for using the battery 18 in place of the external power supply 17 in order to prevent the power-consumption from being concentrated in a given time zone in, e.g., an office. For example, the peak shift time zone 15c is set as "11:00 to 13:00", and stored in the disk array 15 in advance. In the peak shift time zone 15c, the CPU 11 controls the power supply circuit 19. When electric power is supplied from the external power supply 17, the power supply is switched from the external power supply 17 to the battery 18.

If it is in the peak shift time zone 15c (NO in step 402), the start time 15b is shifted by 1 hr (step 403), and the start time 15b is then waited for (step 401).

If it is not in the peak shift time zone 15c (YES in step 402), the CPU 11 checks the power supply (step 404). More specifically, the CPU 11 checks, through the power supply circuit 19, whether electric power is supplied from the external power supply 17 or battery 18. If electric power is supplied from the external power supply 17 (NO in step 404), the priority level of the command for consistency check is set to "high" (step 405). When the priority level of the command is set to "high", as shown in FIG. 2, the consistency check command is inserted at the head of the commands stored at level 3 of the command storage unit 11a1.

If electric power is supplied from the battery 18 (YES in step 404), the CPU 11 checks whether the user sets to perform consistency check even while using the battery 18 (step 406). This setting can be checked by reading the set information 15a stored in the disk array 15. If the user sets the set information 15a to inhibit consistency check while using the battery 18 (NO in step. 406), consistency check is not performed.

If the set information 15a is set to perform consistency check even while using the battery 18 (YES in step 406), the remaining capacity of the battery 18 is obtained from the power supply circuit 19 (step 407). The CPU 11 also determines whether the obtained remaining capacity of the battery 18 is equal to or larger than 50% of the overall capacity (step 408). If the remaining capacity is equal to or larger than 50% of the overall capacity (NO in step 408), the priority level of the command for consistency check is set to "intermediate" (step 409). When the priority level is set to "intermediate", for example, the command for consistency check is inserted in the intermediate position among the commands stored at level 3 of the command storage unit 11a1.

If the remaining capacity of the battery 18 is smaller than 50% of the overall capacity (YES in step 408), the priority level of the command for consistency check is set to "low" (step 410). When the priority level is set to "low", the command for consistency check is inserted at the end of the commands stored at level 3 of the command storage unit 11a1.

When the priority level of the command for consistency check is set in steps 405, 409, and 410, consistency check is performed in accordance with the priority level (step 411). At this time, as in the above-described rebuild process, the RAID control unit 11a controls to normally write/read the data in/from the disk array 15 in accordance with the instruction input by the user from the operation unit 13. When the priority level of the command for consistency check is low, a large number of commands from the user for controlling to write/read the data must be executed. Accordingly, the effective rate of consistency check decreases.

As described above, according to this embodiment, the user can set to inhibit the rebuild process and consistency check for the disk array 15 while using the battery 18. Hence, power consumption while using the battery 18 can decrease, and the operation time can be prolonged.

When the user sets to perform the rebuild process and consistency check even while using the battery 18, the power supply circuit 19 checks the remaining capacity of the battery 18 to decrease the effective rate of the rebuild process and consistency check in accordance with the remaining capacity. At this point, this also contributes to a decrease in power consumption while using the battery 18.

According to this embodiment, since the battery 18 is used in the peak shift time zone 15c in place of the external power supply 17, the power consumption can be prevented from being concentrated in a given time zone during which a large number of notebook type PCs 10 are used in, e.g., an office.

When the user sets to inhibit consistency check while using the battery, and the start time 15b of consistency check is in the peak shift time zone 15c, consistency check may not be executed. However, in this embodiment, since the start time 15b shifts from the peak shift time zone 15c, thus avoiding such a problem.

The number of HDDs used in the disk array 15 is not limited to two. Three or more HDDs can be used. RAID level of the disk array 15 is not limited to RAID1. The RAID level may be RAID4 or RAID5 in which the parity of data is generated in, e.g., the write process, and write/read control of these data and parity is performed.

As shown in FIG. 5, the present invention can be applied to a disk array system including a disk array apparatus and a server. In the example shown in FIG. 5, a server 51 includes the CPU 11, memory 12, operation unit 13, and display unit 14. A disk array apparatus 52 includes the disk array 15 with the HDDs 15-1 and 15-2, the array controller 16, the external power supply 17, the battery 18, and the power supply circuit 19.

In this embodiment, it is determined whether the remaining capacity of the battery is equal to or larger than 50% of the overall capacity as a reference for determining whether the rebuild process and consistency check are to be performed even while using the battery. Of course, this determination reference is not limited to 50%. The determination can be performed using another reference such as the value that the user can set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording apparatus which forms a single logical recording apparatus by arranging a plurality of recording apparatuses in parallel, comprising:
   a power supply unit configured to supply power to the plurality of recording apparatuses;
   a rebuilding unit configured to rebuild data on an arbitrary recording apparatus of the plurality of recording apparatuses by using data on another of the plurality of recording apparatuses;
   a power saving unit configured to perform power saving control for the rebuilding unit on the basis of the type of power supply unit; and
   a remaining capacity check unit configured to check, when the power supply unit is a battery, the remaining capacity of the battery, wherein the power saving unit is configured to control the rebuilding unit on the basis of the remaining capacity of the battery checked by the remaining capacity check unit,
   wherein the power saving unit is configured to define a priority level of control of the rebuilding unit in rebuilding by the rebuilding unit on the basis of the remaining capacity of the battery.

2. An information recording apparatus which forms a single logical recording apparatus by arranging a plurality of recording apparatuses in parallel, comprising:
   a power supply unit configured to supply power to the plurality of recording apparatuses;
   a checking unit configured to check consistency between data of the plurality of recording apparatuses;
   a power saving unit configured to perform power saving control for the checking unit on the basis of the type of power supply unit, wherein the power saving unit is configured to inhibit the checking unit from checking the consistency between data of the plurality of recording apparatuses when the power supply unit comprises a battery; and
   a storage unit configured to store a predetermined battery use time period when a battery is to be used as the power supply unit, wherein the checking unit is configured to shift a start time at which the consistency check starts to a time period other than the predetermined time period.

3. An information recording apparatus which forms a single logical recording apparatus by arranging a plurality of recording apparatuses in parallel, comprising:
   a power supply unit configured to supply power to the plurality of recording apparatuses;
   a checking unit configured to check consistency between data of the plurality of recording apparatuses;
   a power saving unit configured to perform power saving control for the checking unit on the basis of the type of power supply unit; and
   a remaining capacity check unit configured to check, when the power supply unit comprises a battery, the remaining capacity of the battery, wherein the power saving unit is configured to control the checking unit on the basis of the remaining capacity of the battery checked by the remaining capacity check unit,
   wherein the power saving unit is configured to define a priority level of control of the consistency check of the checking unit on the basis of the remaining capacity of the battery.

* * * * *